(12) United States Patent
Huang et al.

(10) Patent No.: US 7,197,867 B2
(45) Date of Patent: Apr. 3, 2007

(54) METHOD FOR THE SIMULTANEOUS DESULFATION OF A LEAN $NO_X$ TRAP AND REGENERATION OF A DIESEL PARTICULATE FILTER

(75) Inventors: Yiqun Huang, San Antonio, TX (US); Shizuo Sasaki, San Antonio, TX (US); Gary D. Neely, San Antonio, TX (US); Jeffrey A. Leet, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 11/174,404

(22) Filed: Jul. 1, 2005

(65) Prior Publication Data

US 2006/0070373 A1 Apr. 6, 2006

Related U.S. Application Data

(60) Provisional application No. 60/615,810, filed on Oct. 4, 2004.

(51) Int. Cl.
*F01N 3/00* (2006.01)
(52) U.S. Cl. .............. 60/295; 60/274; 60/277; 60/280; 60/285; 60/297
(58) Field of Classification Search .............. 60/274, 60/277, 280, 285, 286, 295, 297, 303, 311
See application file for complete search history.

(56) References Cited

U.S. PATENT DOCUMENTS

| | | | |
|---|---|---|---|
| 4,211,075 A | 7/1980 | Ludecke et al. | |
| 5,732,554 A | 3/1998 | Sasaki et al. | |
| 5,771,686 A | 6/1998 | Pischinger et al. | |
| 5,937,639 A | 8/1999 | Sasaki et al. | |
| 6,173,571 B1 | 1/2001 | Kancko et al. | |
| 6,237,330 B1* | 5/2001 | Takahashi et al. | 60/285 |
| 6,276,130 B1 | 8/2001 | Ito et al. | |
| 6,378,297 B1 | 4/2002 | Ito et al. | |
| 6,487,851 B1 | 12/2002 | Okada et al. | |
| 6,546,721 B2 | 4/2003 | Hirota et al. | |
| 6,607,704 B2 | 8/2003 | Guttridge et al. | |
| 6,742,328 B2 | 6/2004 | Webb et al. | |
| 6,769,245 B2 | 8/2004 | Itoh et al. | |
| 6,796,118 B2* | 9/2004 | Kitahara | 60/285 |
| 6,865,883 B2* | 3/2005 | Gomulka | 60/295 |
| 6,904,752 B2* | 6/2005 | Foster et al. | 60/295 |
| 6,962,045 B2* | 11/2005 | Kitahara et al. | 60/295 |

(Continued)

FOREIGN PATENT DOCUMENTS

| | | |
|---|---|---|
| EP | 1 174 598 A2 | 1/2001 |
| EP | 1 382 811 A1 | 1/2004 |
| EP | 1 079 084 B1 | 7/2004 |

*Primary Examiner*—Tu M. Nguyen
(74) *Attorney, Agent, or Firm*—Gunn & Lee, P.C.

(57) ABSTRACT

High exhaust gas temperatures whereby sulfur is removed from a lean NOx traps simultaneously with regeneration of a Diesel particulate filter is provided by alternating engine operation in respectively defined lean and rich combustion modes. The duration and frequency of the respective lean and rich operating modes, as well as the air/fuel ratio during the respective modes, are preferably controlled by the sensed temperature of the lean NOx trap substrate.

10 Claims, 3 Drawing Sheets

U.S. PATENT DOCUMENTS

| | | |
|---|---|---|
| 2004/0055285 A1 | 3/2004 | Rohr et al. |
| 2004/0083719 A1* | 5/2004 | Xu et al. ..................... 60/285 |
| 2004/0112042 A1 | 6/2004 | Hoffman et al. |
| 2004/0123588 A1* | 7/2004 | Stanglmaier et al. ......... 60/295 |
| 2004/0128985 A1* | 7/2004 | Shimasaki et al. ............ 60/286 |
| 2005/0086933 A1* | 4/2005 | Nieuwstadt et al. .......... 60/297 |

* cited by examiner

METHOD FOR THE SIMULTANEOUS DESULFATION OF A LEAN NO$_x$ TRAP AND REGENERATION OF A DIESEL PARTICULATE FILTER

This is a non-provisional application claiming priority to U.S. Provisional Application Ser. No. 60/615,810 filed Oct. 4, 2004.

BACKGROUND OF THE INVENTION

1. Technical Field

This invention relates generally to a method for removing sulfur from a lean NOx trap while simultaneously regenerating a Diesel particulate filter, and more particularly to such a method that controls the duration and frequency of engine operation in a rich combustion mode concurrently with control of the air/fuel ratio to provide the high temperature requirements of lean NO$_x$ trap desulfation and the oxidation of particles trapped in a Diesel particulate filter.

2. Background Art

Worldwide emissions regulations slated for introduction in the near future impose very stringent emissions regulations. The Tier 2 regulations in the United States require that Diesel vehicles have the same ultra-low emissions levels as spark ignited vehicles. Combustion mode changes, to address both in-cylinder (engine-out) and exhaust gas treatment device requirements have been proposed. For example, U.S. Pat. No. 5,732,554, issued Mar. 31, 1998 to Shizuo Sasaki, et al. for an EXHAUST GAS PURIFICATION DEVICE FOR AN INTERNAL COMBUSTION ENGINE describes a method by which the normal fuel lean operating mode of an engine is switched to a rich premixed charge compression ignition (PCCI) combustion mode.

U.S. Pat. No. 5,937,639 granted Aug. 17, 1999 to Shizuo Sasaki, et al. for INTERNAL COMBUSTION ENGINE describes an alternative method for lowering the combustion temperature, i.e., low temperature combustion (LTC) to minimize smoke generation during rich, or near rich, combustion. LTC and PCCI combustion are alternative combustion modes which normal Diesel lean combustion can be transitioned to during engine operation.

Perhaps of most concern to the Diesel engine market are the proposed very tight future reductions in terms of oxides of nitrogen (NO$_x$) and particulate matter (PM) emissions. One of the most promising technologies for NO$_x$ treatment is a NO$_x$ adsorber, also known as a "lean NO$_x$ trap." Diesel particulate filters, also known as Diesel particulate traps, and lean NO$_x$ traps are the most likely, at least in the foreseeable future, means by which emissions will be reduced. Lean NOx traps and Diesel particulate filters need to be regenerated periodically to restore their efficiencies. The regeneration of lean NO$_x$ traps is usually done by providing reductants, such as CO and HC under oxygen-free conditions. A regenerated lean NO$_x$ trap not only adsorbs NO$_x$ emissions, but also adsorbs sulfur carried in the exhaust gas stream. Sulfur removal (desulfation) must be undertaken at a temperature above 600° C. under oxygen-free conditions, i.e., a stoichiometric or richer air/fuel ratio. Under typical Diesel lean combustion operation, such very high temperatures cannot normally be obtained except under very high load conditions. Diesel particulate filter regeneration is carried out by oxidizing soot and other particles "trapped" in the Diesel particulate filter at a high temperature and a lean air/fuel ratio.

Thus it can be seen that both desulfation of a lean NO$_x$ trap and regeneration of a Diesel particulate filter require very high temperatures. However, typical Diesel combustion cannot provide high exhaust gas temperatures because the engine operates with a lean to very lean combustion mixture. Heretofore, post-injection or in-exhaust injection has been used to obtain the required aftertreatment device regeneration temperatures. Post-injection can result in undesirable oil dilution due to wetting of the cylinder liner, and in-exhaust injection requires extraneous hardware. Morever, the desulfation process requires a substantially oxygen free atmosphere, whereas Diesel particulate filter regeneration is an oxidization process. Heretofore, these conflicting requirements have, of necessity, been carried out in separate operations.

The present invention is directed to overcoming the problems set forth above. It is desirable to have a method by which desulfation of the a lean NO$_x$ trap (LNT) is carried out concurrently with oxidizing trapped particulate matter in a Diesel particulate filter (DPF).

SUMMARY OF THE INVENTION

In accordance with one aspect of the present invention, a method for simultaneously removing sulfur from a lean NO$_x$ trap and regenerating a Diesel particulate filter comprises identifying when desulfation of a lean NO$_x$ trap associated with the engine is required, and then determining a desired rich combustion mode for temporary operation of the engine. The substrate temperature of the lean NO$_x$ trap is sensed and the temperature of the exhaust gas prior to the exhaust gas passing through a turbocharger associated with the engine is also sensed. The engine is operated in alternating lean and rich combustion modes for respective predefined periods of time. The respective periods of time are of a frequency and duration that is sufficient to increase the substrate temperature of a lean NO$_x$ trap to a temperature at which sulfur accumulations stored in the lean NO$_x$ trap is reduced and the Diesel particulate trap is simultaneously regenerated.

Other features of the method for simultaneous lean NO$_x$ trap sulfur removal and Diesel particulate filter regeneration include controlling the air/fuel ratio and the frequency and duration of time of operation in the alternating rich combustion mode to prevent the sensed temperature of exhaust gas prior to passing through the turbine stage from exceeding a predefined value.

Another feature of the present invention includes determining that the engine is operating in a predefined relatively low load region of the engine operating range and then operating of the engine between alternating lean and rich combustion modes includes alternately operating the engine respectively in a lean low temperature combustion mode and a rich low temperature combustion mode.

Yet another feature of the method for simultaneous lean NO$_x$ trap sulfur removal and Diesel particulate filter regeneration, in accordance with the present invention includes determining that the engine is operating in a predefined medium or high load region of the engine operating range and then operating the engine in alternately lean and rich combustion modes, wherein the lean combustion mode may be either standard Diesel or lean premixed charge compression ignition combustion and the rich combustion mode is provided by rich pre-mixed charge compression ignition combustion.

BRIEF DESCRIPTION OF THE DRAWINGS

A more complete understanding of the method for simultaneously removing sulfur from a lean $NO_x$ trap and regenerating a Diesel particulate filter may be had by reference to the following detailed description when taken in conjunction with the accompanying drawings, wherein.

DETAILED DESCRIPTION OF THE INVENTION

As discussed above, low temperature combustion (LTC) and pre-mixed charge compression ignition (PCCI) are alternative modes of combustion other than conventional Diesel combustion. Both LTC and PCCI combustion modes can provide the high temperature requirements for aftertreatment device regeneration, while minimizing smoke generation maintaining low NOx emissions.

Lean and rich operation can be provided in both LTC and PCCI combustion modes. Lean operation, i.e., a mixture of intake air and fuel that is leaner than a stoichiometric mixture (an ideal air-to-fuel mixture at which all of the air and all of the fuel are consumed during the combustion process), is typical of normal Diesel operation Rich operation, i.e., an air-to-fuel mixture richer than stoichiometric, can be provided by throttling the intake air, increasing the exhaust gas recirculation (EGR) rate and varying turbocharger operation. There are various methods for injecting the additional fuel necessary to provide rich operation and control intake throttle, exhaust gas recirculation, and turbocharger operation. The "air-to-fuel ratio" (air/fuel ratio or simply A/F ratio) as used herein refers to the combustible mixture of air and fuel present in a combustion chamber either prior to, during, or immediately after combustion, and may consist of one or more components including ambient air, recirculated exhaust gas, and compressed air provided by the compressor stage of a turbocharger.

In the preferred embodiment of the present invention, alternating rich and lean low temperature combustion modes when operating under low to light load engine conditions, provide the required high lean $NO_x$ trap and Diesel particulate filter regeneration temperature as well as a rich exhaust gas mixture for desulfation of the LNT. Under medium to high load engine operating conditions, alternating rich premixed charge compression ignition combustion (a stoichiometric or richer A/F ratio) and either normal Diesel or PCCI lean combustion provide the required high lean $NO_x$ trap and Diesel particulate filter temperatures along with providing a rich exhaust for sulfur removal.

Figure 1:
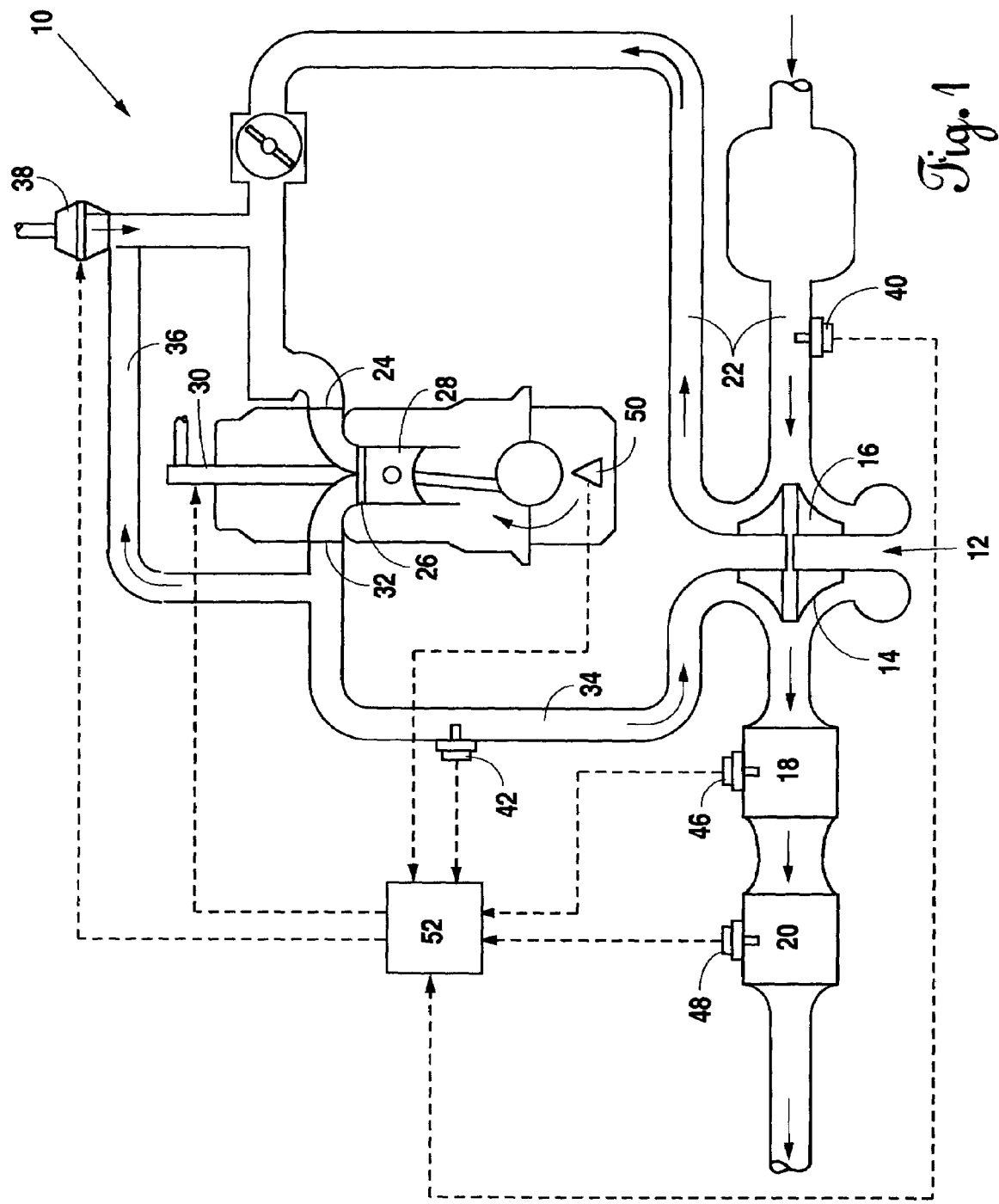
FIG. 1 is a somewhat schematic illustration of a typical Diesel engine suitable for the purpose of illustrating the method embodying the present invention.

A conventional Diesel engine 10 is schematically represented in FIG. 1, and will be used in the following discussion of the method for simultaneously removing sulfur from a lean $NO_x$ trap and regenerating a Diesel particulate filter in accordance with a preferred embodiment of the present invention. The Diesel engine 10 is equipped with a turbocharger 12 that has a turbine stage 14 driven by exhaust gas and coupled to a compressor stage 16 for the purpose of compressing intake air prior to introduction into the engine. Also, the engine 10 has a Diesel particulate filter 18 disposed downstream of the turbine stage 14 and a lean $NO_x$ trap 20 positioned downstream of the Diesel particulate filter 18. A flow of compressed intake air is directed through an intake conduit 22 to an intake port 24 of the engine 10. Fuel is introduced into a combustion chamber 26 having a piston 28 by a fuel injector 30. After combustion of a controlled air/fuel (A/F) mixture in the combustion chamber 26, exhaust gas is directed through an exhaust port 32 to an exhaust gas conduit 34 in controlled communication with the turbine stage 14 of the turbocharger 12. An exhaust gas recirculation (EGR) system 36 provides communication between the exhaust conduit 34 and the intake conduit 22 to recirculate controlled amounts of exhaust gas back into the intake air introduced into the engine. Exhaust gas flow through the EGR system 36 is controlled by an exhaust gas recirculation valve 38.

The engine 10 desirably has an intake air mass flow sensor 40, or other means for measuring intake air mass flow, disposed upstream of the compressor stage 16, and temperature sensor 42 disposed in the exhaust conduit 34 at a position upstream between the exhaust port 32 and the turbine stage 14 of the turbocharger 12. Additional temperature sensors 46 and 48 are arranged to respectively sense the internal, i.e., substrate or other, temperature of the Diesel particulate filter 18 and the lean $NO_x$ trap 20. Additionally, a crankshaft position sensor 50 provides crankshaft position and engine speed signals to a conventional programmable electronic engine control unit (ECU) 52. The intake air mass flow sensor 40, the pre-turbine exhaust gas temperature sensor 42, the post-turbine exhaust gas temperature sensor 44, and the DPF and LNT temperature sensors 46, 48 are in electrical communication with the programmable ECU 52. In response to sensed signals, as described below in greater detail, the programmable ECU 52 provides output signals to the fuel injector 30, the turbocharger 12, and the exhaust gas recirculation control valve 38.

In a preferred embodiment of the present invention, a requirement for sulfur removal from the LNT 20 is determined, for example, after a predetermined length of time of operation or by a suitable sensor, not shown, positioned downstream of the LNT. When it is determined that sulfur removal is required, the engine control module 52 determines the desired modes for respective alternating rich and lean combustion modes, that is, either normal Diesel, low temperature combustion or pre-mixed charge compression ignition combustion. The determination for the desired combustion modes is primarily based on engine load and speed, parameters which can be at least partially provided by the intake air mass flow sensor 40, the injected fuel mass, and the crankshaft position sensor 50.

Figure 2:
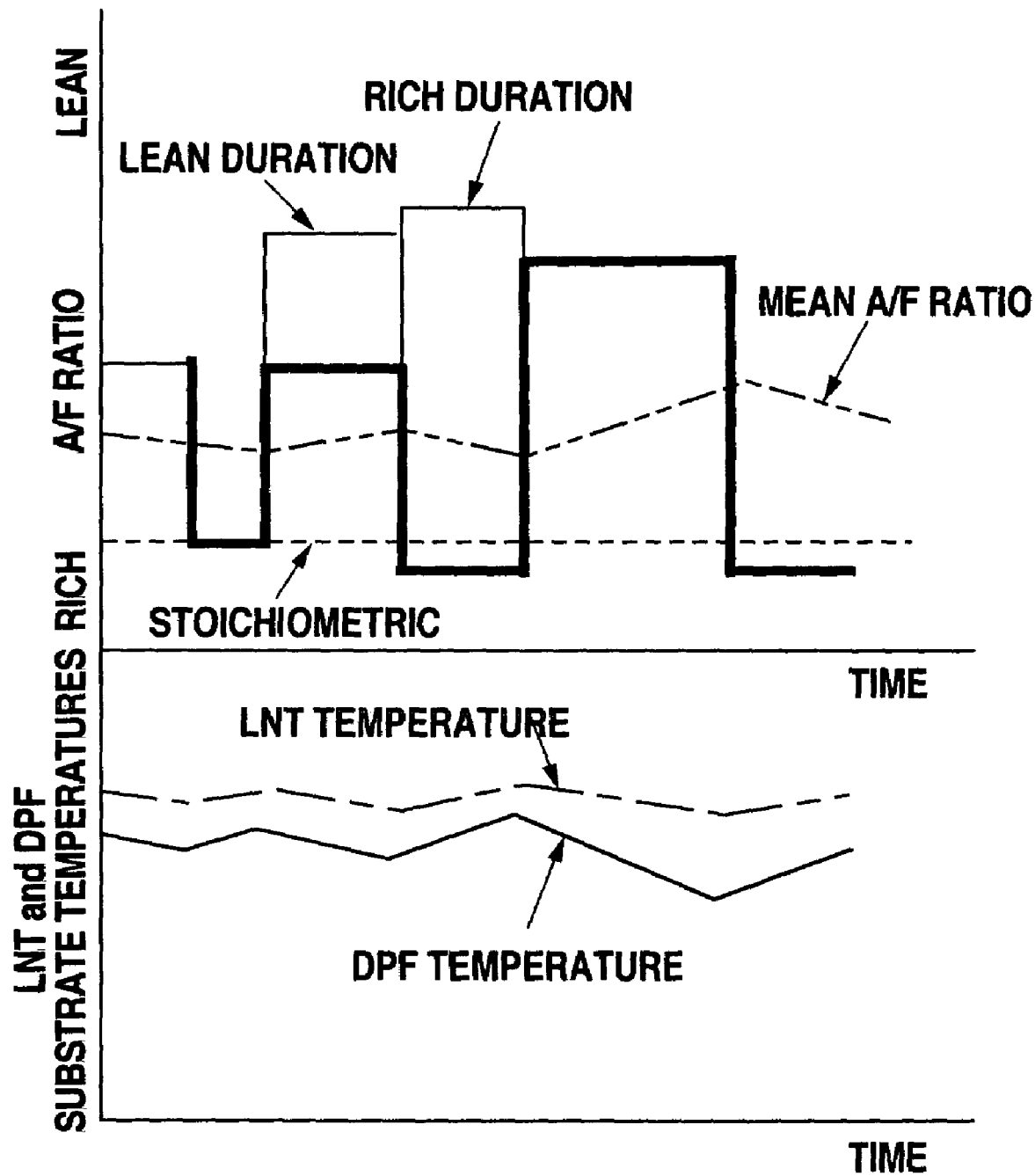
FIG. 2 is a graphical illustration of the air/fuel ratio control to provide high lean $NO_x$ trap and Diesel particulate filter temperatures in accordance with the present invention.
Figure 3:
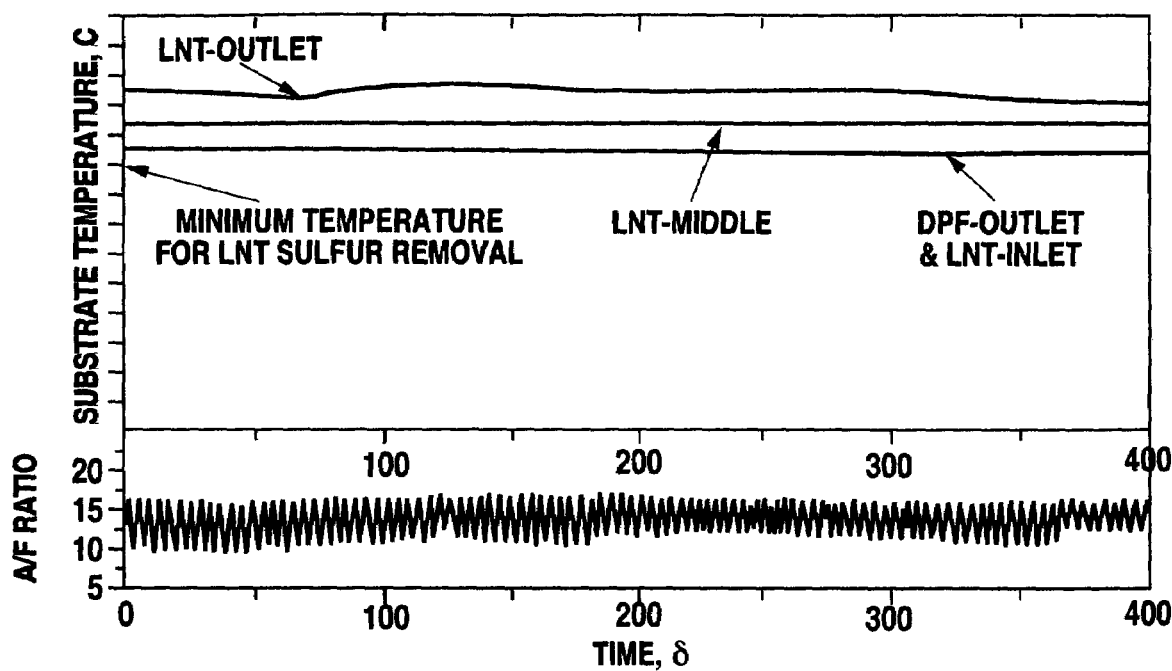
FIG. 3 is a graphical illustration of the use of alternating lean low temperature combustion and rich low temperature combustion for simultaneous lean $NO_x$ trap desulfation and DPF regeneration.
Figure 4:
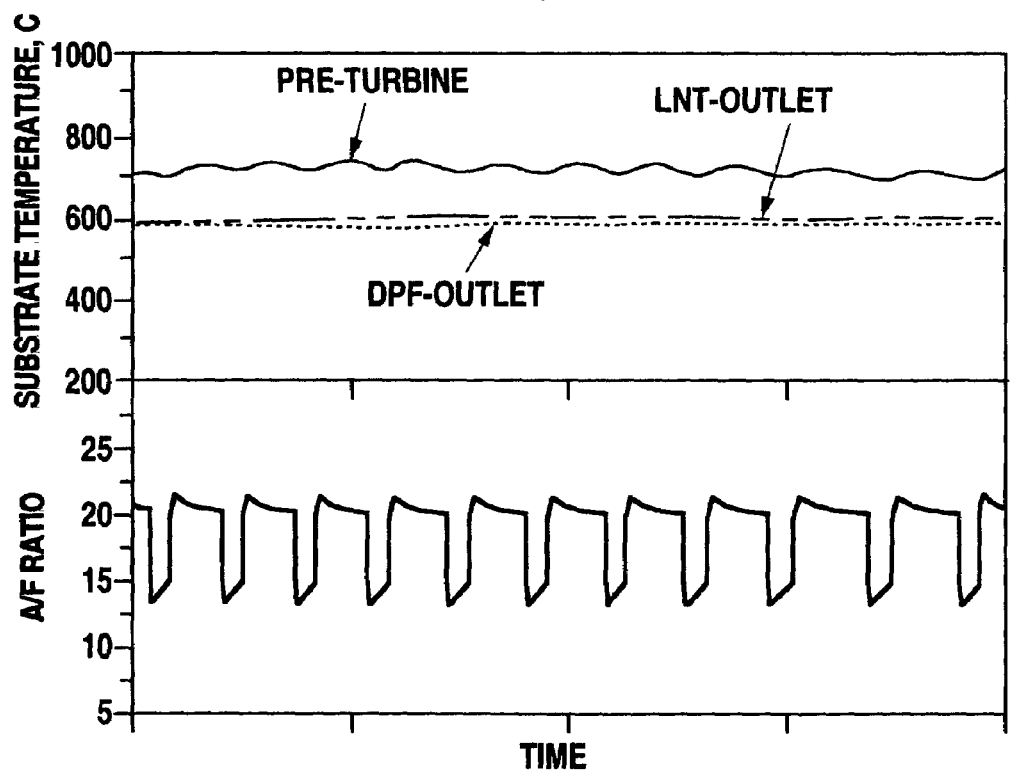
FIG. 4 is a graphical representation of alternating premixed charge compression ignition lean and rich combustion control operation for lean $NO_x$ trap desulfation and Diesel particulate filter regeneration in accordance with the present invention.

As illustrated in FIG. 2, the engine is then temporarily operated alternately between the desired rich and lean combustion modes for a selected length of time. Exhaust gas produced during the alternating periods of lean combustion contain excess oxygen (oxygen not consumed during combustion) and, in the high temperature exhaust environment provided in accordance with the present invention, oxidizes particulate matter trapped in the Diesel particulate filter 18. During the alternating periods of rich combustion, the amount of excess air, if any, is minimized and the lean Nox trap 20 is desulfated and regenerated. As illustrated in FIGS. 3 and 4, the DPF and LNT temperatures are maintained at a high temperature so that the respective regeneration and desulfation processes are advantageously simultaneously carried out during the alternating periods of lean and rich operation.

The duration and frequency of respective operation in the lean and rich combustion modes, and the respective lean and rich air/fuel ratios, and accordingly the mean air/fuel ratio, are controlled based on the temperature feedback signal from the temperature sensor 48 sensing the substrate temperature in the lean $NO_x$ trap 20. As illustrated in FIG. 2, it can be seen that the lean air/fuel ratio decreases during the alternating periods of rich combustion and increases during the alternating periods of lean combustion. Also, it can be seen that the substrate temperature of the lean $NO_x$ trap 20 and the Diesel particulate filter 18 decreases during alternating periods of lean combustion and increases during alternating periods of rich combustion.

Thus, the high lean $NO_x$ trap and Diesel particulate filter temperatures required for removal of sulfur from the lean $NO_x$ trap 20 and regenerate the Diesel particulate filter 18 are provided by controlling the immediate and mean air/fuel ratios, and the duration and frequency of the respective periods of lean and rich combustion operation.

The pre-turbine exhaust gas temperature, sensed by the temperature sensor 42, provides a convenient safety control to limit the maximum equivalence ratio, both during rich and lean combustion, and the maximum pulse duration and frequency of rich combustion to avoid exceeding a temperature that could damage the turbine 14 or other downstream components. Moreover, the mean value of the A/F ratio during operation in the respective alternating lean and rich operation modes may be calculated by the engine control module 52 and used as input for the control logic to control fuel, exhaust gas recirculation, and airflow. By controlling the mean air/fuel ratio, the temperature gradient across the Diesel particulate filter and the lean $NO_x$ trap can be limited.

FIG. 3 graphically illustrates engine operation in a defined relatively low, or light, load operating region of the engine in which low temperature combustion is desirably used for lean and rich operation. The substrate temperature of the lean $NO_x$ trap 20 is used as a feedback signal for closed-loop control of the lean, rich, and mean A/F ratios, and pulse duration and frequency of operation in the respective lean and rich combustion modes. Under very light load operation, the engine-out temperature is low, for example, on the order of 100° C. to 200° C. Therefore, the alternating periods of lean and rich combustion must be carried out at a relatively high frequency to maintain the exothermic reactions in the DPF 18 and LNT 20 and increase the exhaust stream temperature discharged from the DPF.

When operating in predefined medium to high engine loads in which rich pre-mix charge compression ignition combustion is desired, the lean $NO_x$ trap substrate temperature is also used as a feedback signal for closed-loop control of the lean, rich, and mean A/F ratios, and the duration frequency of the respective lean and rich combustion operating modes. As illustrated in FIG. 4, the pre-turbine temperature, sensed by the temperature sensor 42, disposed in the exhaust conduit 34 upstream of the turbine section 14, is also used as a feedback signal for adjusting the fuel injection parameters so that the pre-turbine temperature will not exceed the maximum working temperature of the turbocharger 12. Under higher loads, the engine-out exhaust gas temperature is much higher than at low loads. Therefore, the rich periods of alternating lean and rich combustion are carried out at a lesser frequency and for a shorter duration.

Thus, in accordance with the present invention, when it is determined that sulfur accumulations stored in the lean $NO_x$ trap needs to be reduced, or removed, the desired rich combustion mode, i.e., for example LTC or PCCI combustion, is determined by the engine control unit 52. The sensed substrate temperature of the lean $NO_x$ trap 20 is used to control the lean, rich, and mean A/F ratios, as well as the duration and frequency of the respective lean and rich combustion modes. The engine is alternately operated in the desired rich and lean combustion modes for respective predefined periods of time and at a frequency and duration sufficient to increase the mean substrate temperature of the lean $NO_x$ trap 20 to a temperature at which the sulfur accumulations stored in the lean $NO_x$ trap 20 is reduced and the Diesel particulate trap 18 is simultaneously regenerated. The pre-turbine exhaust gas temperature, sensed by the sensor 42, is used to regulate the A/F ratio and the frequency and duration of time in the respective alternating rich and lean combustion modes to prevent the sensed temperature of the exhaust gas prior to passing through the turbine stage 14 from exceeding a predefined value to prevent thermal damage to the turbocharger 14 or other engine component.

When it is determined that the engine 10 is operating in a predefined low load region of the engine operating range, it may be alternately operated in a respective lean low temperature combustion mode and a rich low temperature combustion mode.

When it is determined that the engine 10 is operating in either a predefined medium or high load region of the engine operating range, the engine may be operated alternatingly in either a standard Diesel or in a lean pre-mixed charge compression ignition combustion mode, and a rich pre-mixed charge compression ignition combustion mode.

Importantly, when operating in any of the determined operating modes, the frequency and pulse duration of the respective combustion modes and air/fuel ratio is modified in response to the sensed value of the substrate temperature of the lean $NO_x$ trap to provide a high exhaust gas temperature that is sufficient for LNT desulfation and DPF regeneration.

Moreover, if desired for the purpose of providing an exhaust gas temperature to heat the substrate of the lean $NO_x$ trap 20 to a desired high temperature, the engine may be alternately operated respectively in either a standard Diesel combustion mode and a lean pre-mixed charge compression ignition combustion mode or a standard Diesel combustion mode supplemented by the post-injection of fuel.

In the above discussion of the present invention in which the substrate temperature of the lean NOx trap if provided to a programmable electronic engine control unit for the purpose of controlling A/F ratio and the duration and frequency of the respective alternating lean and rich combustion modes, it should be recognized that the substrate temperature of the lean NOx trap can be used by the programmable electronic engine control unit to modify or control other engine operating parameters, such as the exhaust gas recirculation rate and the amount of boost provided to the intake air by the compressor stage 16 of the turbocharger 12.

From the above description, it can be seen that by controlling the frequency, pulse duration and A/F ratio of respective alternating lean and rich combustion, that the temperature and composition of the exhaust gas can be controlled in a manner such that the desulfation of the lean $NO_x$ traps and regeneration of the Diesel particulate filters can be carried out simultaneously. Low temperature combustion and pre-mixed charge compression ignition modes are the preferred combustion modes to provide the very high mean temperatures required to remove sulfur from the LNT and regenerate the DPF.

The present invention is described above in terms of a preferred illustrative embodiment in which those skilled in the art will be able to readily determine the desired air/fuel ratio as well as the duration and frequency of respective operation in the selected lean and rich combustion modes. Also, although Lean $NO_x$ trap substrate temperature is used in the illustrative example to control respective lean and rich combustion, other appropriate temperature measurements, such as lean $NO_x$ trap inlet temperature, could be used in carrying out the present invention.

Other aspects, features and advantages of the present invention may be obtained from a study of this disclosure and the drawings, along with the appended claims.

We claim:

1. A method for simultaneous removal of sulfur from a lean $NO_x$ trap and regeneration of a Diesel particulate filter of a Diesel engine equipped with a turbocharger, said method comprising:
   determining a need to reduce sulfur accumulations stored in said lean $NO_x$ trap;
   determining a desired rich combustion mode for temporary operation of the engine;
   sensing the substrate temperature of said lean $NO_x$ trap;
   sensing the temperature of exhaust gas prior to the exhaust gas passing through a turbine stage of said turbocharger;
   alternatingly operating said engine in a lean combustion mode and said desired rich combustion mode for respective predefined periods of time, said respective periods of time being of a frequency and duration sufficient to increase said substrate temperature of the lean $NO_x$ trap to a temperature at which said sulfur accumulations stored in the lean $NO_x$ trap are reduced and said Diesel particulate trap is simultaneously regenerated; and
   controlling air/fuel ratio and the frequency and duration of time of operation n said alternating lean and rich operating moods to prevent temperature of the exhaust gas prior to passing through the turbocharger from exceeding a predefined value.

2. The method for simultaneous removal of sulfur from a lean $NO_x$ trap and regeneration of a Diesel particulate filter, as set forth in claim 1, wherein said predefined value of temperature of temperature of the exhaust gas passing through the turbocharger is the maximum working temperature of the turbocharger value.

3. A method for simultaneous removal of sulfur from a lean $NO_x$ trap and regeneration of a Diesel particulate filter of a multiple cylinder Diesel engine equipped with a turbocharger in a single exhaust stream, said method comprising:
   determining a need to reduce sulfur accumulations stored in said lean $NO_x$ trap;
   determining a desired rich combustion mode for temporary operation of the engine;
   sensing the substrate temperature of said lean $NO_x$ trap located in said single exhaust stream;
   sensing the temperature of exhaust gas prior to the exhaust gas passing through a turbine stage of said turbocharger in said single exhaust stream;
   alternatingly operating all cylinders of said engine in a lean combustion mode and said desired rich combustion mode for respective predefined periods of time, said respective periods of time being of a frequency and duration sufficient to increase said substrate temperature of the lean $NO_x$ trap to a temperature at which said sulfur accumulations stored in the lean $NO_x$ trap are reduced and said Diesel particulate filter is simultaneously regenerated;
   controlling the air/fuel ratio and the frequency and duration of time of operation in said alternating lean and rich operating modes to prevent the temperature of the exhaust gas prior to passing through the turbine stage from exceeding a predefined value.

4. The method for simultaneous removal of sulfur from a lean $NO_x$ trap and regeneration of a Diesel particulate filter, as set forth in claim 3, wherein said predefined value of temperature of the exhaust gas passing through the turbine stage is the maximum working temperature of the turbocharger.

5. The method for simultaneous removal of sulfur from a lean $NO_x$ trap and regeneration of a Diesel particulate filter, as set forth in claim 3, wherein said determining a desired rich combustion mode for temporary operation of the engine includes determining that said engine is operating in a predefined low load region of the engine operating range, and said alternatingly operating said engine in a lean combustion mode and said desired rich combustion mode includes alternatingly operating said engine respectively in a lean low temperature combustion mode and a rich low temperature combustion mode.

6. The method for simultaneous removal of sulfur from a lean $NO_x$ trap and regeneration of a Diesel particulate filter, as set forth in claim 3, wherein said determining a desired rich combustion mode for temporary operation of the engine includes determining that said engine is operating in one of a predefined medium and high load region of the engine operating range, and said alternatingly operating said engine in a lean combustion mode and said desired rich combustion mode includes alternatingly operating said engine respectively in one of a standard Diesel combustion mode and a lean pre-mixed charge compression ignition combustion mode when lean combustion is desired, and in one of a standard Diesel combustion mode and a pre-mixed charge compression ignition combustion mode, supplementing the post injection of fuel when rich combustion is desired.

7. The method for simultaneous removal of sulfur from a lean $NO_x$ trap and regeneration of a Diesel particulate filter, as set forth in claim 3, wherein said method includes providing said sensed substrate temperature of the lean $NO_x$ trap to a programmable electronic engine control unit and adjusting at least one engine operating parameter in response to the sensed substrate temperature.

8. The method for simultaneous removal of sulfur from a lean $NO_x$ trap and regeneration of a Diesel particulate filter, as set forth in claim 3, wherein said method includes controlling the mean air/fuel ratio to control the temperature and the temperature across said lean $NO_x$ trap and said Diesel particulate filter.

9. The method for simultaneous removal of sulfur from a lean $NO_x$ trap and regeneration of a Diesel particulate filter, as set forth in claim 3, wherein said determining a desired rich combustion mode for temporary operation of the engine includes determining that said engine is operating in one of a predefined medium and high load region of the engine operating range, and said alternatingly operating said engine in a lean combustion mode and said desired rich combustion mode includes alternatingly operating said engine respectively in one of a standard Diesel combustion mode and a lean pre-mixed charge compression ignition combustion mode when lean combustion mode is desired, and in a rich pre-mixed charge compression ignition combustion mode when rich combustion is desired.

10. The method for simultaneous removal of sulfur from a lean $NO_x$ trap and regeneration of a Diesel particulate filter, as set forth in claim 9, wherein the frequency and duration of said respective periods of time and the air/fuel ratio during the respective periods of time is modified in response to the sensed value of the substrate temperature of said lean $NO_x$ trap.

* * * * *